United States Patent [19]
Peppiatt et al.

[11] Patent Number: 5,088,745
[45] Date of Patent: Feb. 18, 1992

[54] SEALS AND SEAL ASSEMBLIES

[75] Inventors: Nicholas A. Peppiatt, Lightwater; Paul C. Chambers, Church Crookham, both of England

[73] Assignee: Hallite Seals International Limited, England

[21] Appl. No.: 608,270

[22] Filed: Nov. 2, 1990

[30] Foreign Application Priority Data

Nov. 9, 1989 [GB] United Kingdom ............... 8925358

[51] Int. Cl.⁵ ................... F16J 15/16; F16K 41/00
[52] U.S. Cl. .................... 277/214; 277/27; 277/58; 277/177; 277/201
[58] Field of Search .............. 277/214, 207 R, 58, 277/215, 173, 201, 57, 188 A, 176, 177, 27, 167.3; 92/82, 86, 168

[56] References Cited

U.S. PATENT DOCUMENTS

| | | | |
|---|---|---|---|
| 1,999,094 | 4/1935 | Gordon | 277/201 |
| 2,202,944 | 6/1940 | Boyd | 277/58 |
| 2,297,112 | 9/1942 | Phillips | 277/215 |
| 2,925,296 | 2/1960 | Howlett et al. | 277/215 |
| 3,009,721 | 11/1961 | Newton | 277/188 A |
| 3,214,182 | 10/1965 | Herbruggen | 277/201 |
| 3,351,350 | 11/1967 | Shepler | 277/58 |
| 3,521,893 | 7/1970 | Josephson | 277/188 A |
| 3,743,303 | 7/1973 | Pope | 277/173 X |
| 3,771,799 | 11/1973 | Sekulich et al. | 277/58 X |
| 4,681,326 | 7/1987 | Kubo | 277/215 X |
| 4,702,482 | 10/1987 | Oseman | 277/177 X |

FOREIGN PATENT DOCUMENTS

| | | | |
|---|---|---|---|
| 39359 | 4/1981 | Japan | 277/215 |
| 314865 | 6/1929 | United Kingdom | 277/215 |
| 328671 | 4/1930 | United Kingdom | 277/201 |
| 2125515 | 3/1984 | United Kingdom | 277/214 |
| 2219050 | 11/1989 | United Kingdom | 277/58 |

Primary Examiner—Daniel M. Yasich
Assistant Examiner—James K. Folker
Attorney, Agent, or Firm—Larson and Taylor

[57] ABSTRACT

Buffer seal rings are described, and gland seals using them. The ring seats in an axially oversize housing groove in the gland bore in order to protect a main rod seal from pressure shocks. To avoid the possibly damaging effects of pressure trapping between the rod seal and buffer seal, the buffer seal has a sealing face on the rod seal side which includes a recessed driving surface e.g. an annular channel, lying inside an annular sealing portion. The driving surface communicates with the fluid in the bore through communication recesses, e.g. slots in an inner support rib, so that excess pressure on that side can drive the ring axially out of sealing and allow the pressure to be relieved through axially-extending pressure release grooves around the edge and oppostie face of the ring.

20 Claims, 3 Drawing Sheets

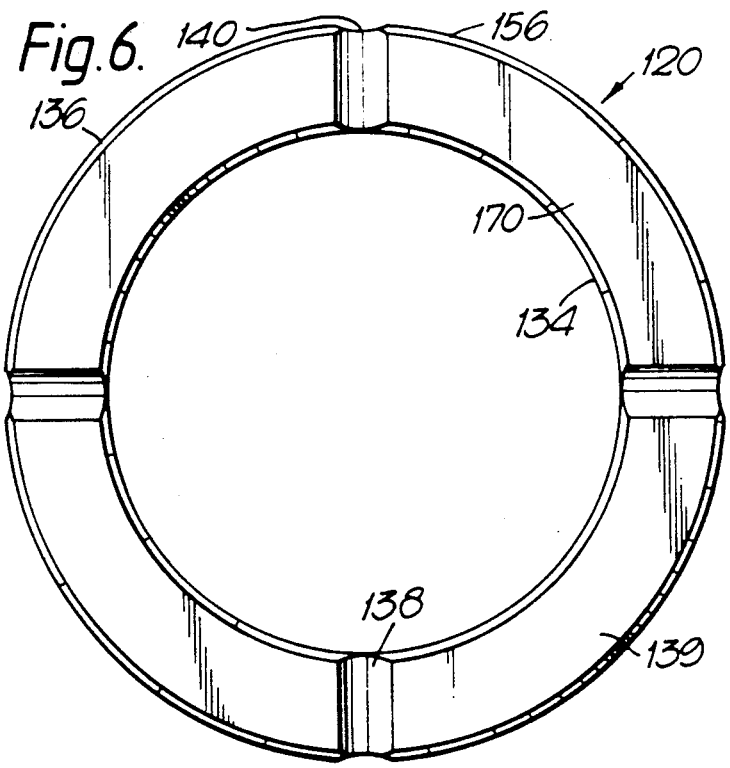
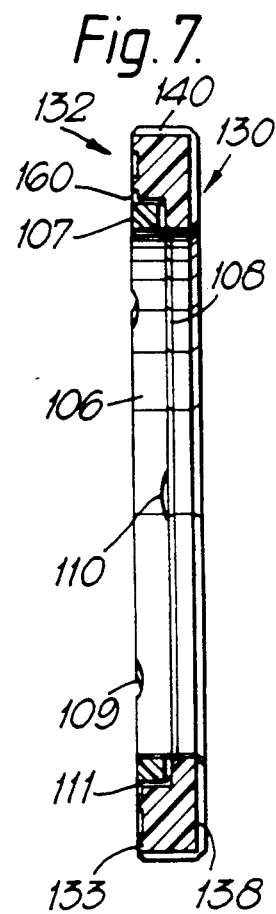
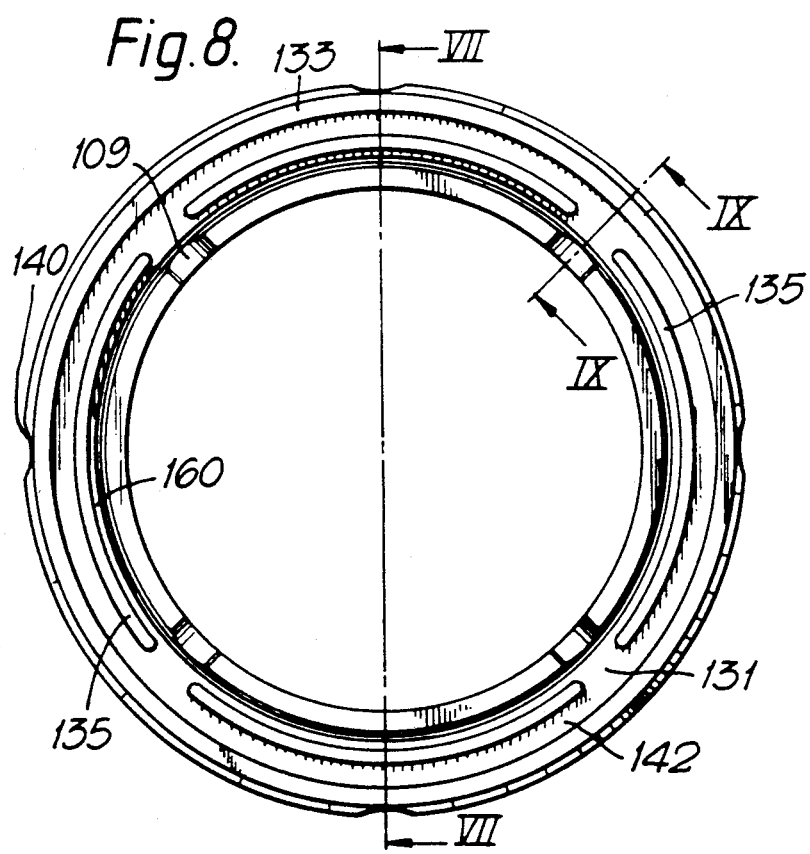
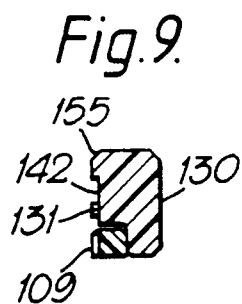

SEALS AND SEAL ASSEMBLIES

FIELD OF THE INVENTION

The present invention relates to seals and seal assemblies, and particularly to buffer seals for hydraulic cylinder glands.

BACKGROUND OF THE INVENTION

The bore of a typical hydraulic cylinder gland has a seal housing portion in which one or more seal rings are seated in annular grooves extending around the bore. The seals are retained axially by the radial walls of the grooves and fit with radial interference between the seal housing bore and the piston rod which acts in it. Usually there is a main rod or gland seal which seals against the piston rod and serves to prevent, or at least to minimise, escape of the hydraulic fluid. It is common also to provide a buffer seal ring, on the pressure side of the rod seal. The purpose of the buffer seal is to shield the rod seal from the direct effect of pressure shock or "spikes" which may occur from time to time. For example, such shocks may occur when the bucket of a hydraulically-powered mechanical digger hits a rock instead of earth.

To achieve this buffering effect, the buffer seal has conventionally been provided as a rectangular-section ring having a degree of axial freedom in its seating groove.

In some instances the sealing of the buffer seal can lead to pressure trapping in the space between the rod seal and the buffer seal. Such pressure trapping may lead to higher friction and wear and, if the trapped pressure is sufficiently high, to extrusion damage. Extrusion damage may be caused to the buffer seal or, more seriously, may affect the rod seal itself.

SUMMARY OF THE INVENTION

It is an object of the invention to provide a novel seal which can serve to reduce this disadvantageous pressure trapping.

According to the invention, this object is achieved by providing a seal which when used as a buffer seal is adapted to form a seal under the influence of cylinder pressure, but can be driven axially by an excess pressure on the rod seal side, by access of fluid on that side to a driving space between a driving surface of the buffer seal on that side and the opposing housing groove wall, to a condition in which preferably fluid can flow past it to relieve that excess pressure.

Preferably the seal has a first axially-facing side that is to face towards the rod seal in use, an outer sealing portion that can contact the housing groove side wall all around the seal in the sealing condition, and an inner portion which can communicate with fluid on the rod seal side and which inner portion provides at least one driving surface of substantial radial extent. Under hydraulic pressure on the second side, the sealing portion is pressed axially into sealing engagement with the side wall of the housing groove and, in cooperation with the sealing of the inner diameter of the seal against the piston rod, provides the buffer seal function. Should a substantial excess of pressure arise in the space on the rod seal side, however, this excess pressure is communicated to the driving area or areas and drives the buffer seal axially away from the rod seal to bring its sealing portion out of sealing engagement with the housing.

We prefer to provide one or more pressure release conduits to facilitate fluid flow past the seal in this condition. Each conduit is suitably a channel, hole or groove communicating between the first and second sides of the seal. It should be shut off from the bore space on the first side when the sealing portion seals against the housing. This can be arranged by having its opening on the first, sealing, face either in or radially outwardly of the sealing portion. A preferred type of conduit is a groove on the periphery of the seal ring, extending in the axial direction. Desirably plural conduits are provided, distributed around the seal.

These conduits may communicate with further conduits, e.g. grooves, extending radially inwardly on the second face of the seal. This facilitates fluid communication past the seal when the second face may be pressed against the corresponding part of the housing groove by excess pressure.

The fluid communication and driving area on the first side (sealing side) may be provided by means of one or more recesses on that side. These may extend from at or near the inner diameter of the face, so as to communicate with the bore of the gland The recesses preferably comprise a plurality of radial communication grooves or notches spaced around the seal face. These in themselves can provide a driving area. However it is particularly preferred to have one or more relatively restricted grooves or notches at or adjacent to the inner diameter, communicating with a larger recessed area or areas of the seal face radially outwardly thereof. The larger recess or recesses may extend substantially around the seal face; for example there may be a complete annular recess extending right around that face.

The larger recesses of course provide a larger axially-directed surface area and hence more driving force for a given pressure on that face of the seal.

This effective surface area—i.e. as projected on a radial plane—of driving surface will usually be at least 10% of the corresponding area of the entire ring, more preferably at least 20% and perhaps even 50% or more.

Particularly with large driving areas there may be a danger of the seal deforming excessively into the driving space, and it is advantageous to provide support portions, e.g. one or more circumferentially extending ribs, or a number of lugs, to engage the housing groove side wall at a position or positions spaced away from the sealing portion. As mentioned above, such support ribs may be interrupted by communication recesses leading to the main driving area.

In another aspect, the invention provides a hydraulic gland seal assembly in which a rod seal, usually single-acting, is seated in a corresponding annular seating groove of the gland bore, and a buffer seal is seated in a further seating groove of the bore, spaced axially from the rod seal on the hydraulic pressure side, the buffer seal having a driving surface spaced from the groove side wall and communicating with the bore on the rod seal side in the manner described above.

BRIEF DESCRIPTION OF THE DRAWINGS

Embodiments of the invention are described below by way of example, with reference to the accompanying drawings in which:

FIG. 6 is a pressure face view of a second buffer seal ring embodying the invention;

FIG. 7 is an axial cross-section at VII—VII (see FIG. 8);

FIG. 8 is a sealing face view, and

FIG. 9 is a radial cross-section at IX—IX (see FIG. 8).

DETAILED DESCRIPTION OF THE PREFERRED EMBODIMENTS

Figure 1:
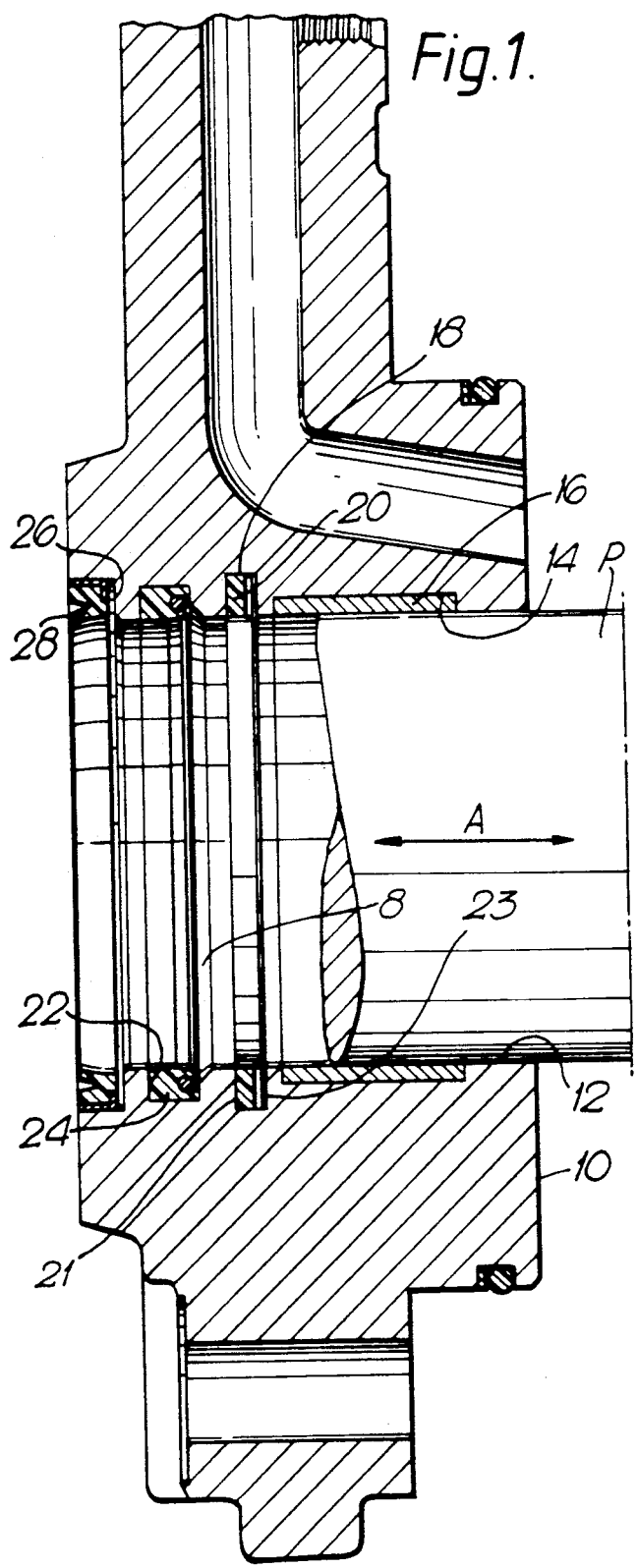
FIG. 1 is a cross section through a hydraulic cylinder gland.
Figure 4:
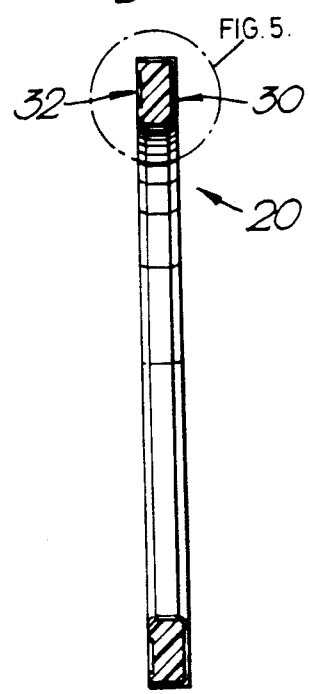
FIG. 4 is a cross-section through the buffer seal at IV—IV.
Figure 5:
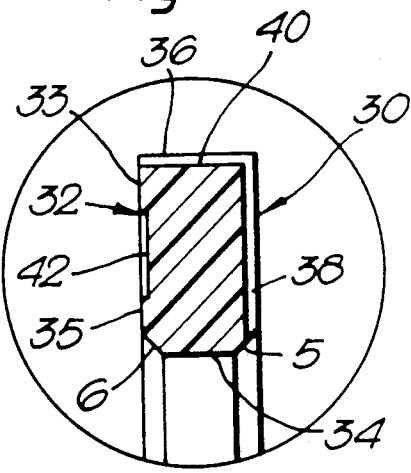
FIG. 5 is an enlarged view of the ringed section in FIG. 4.
Figure 2:
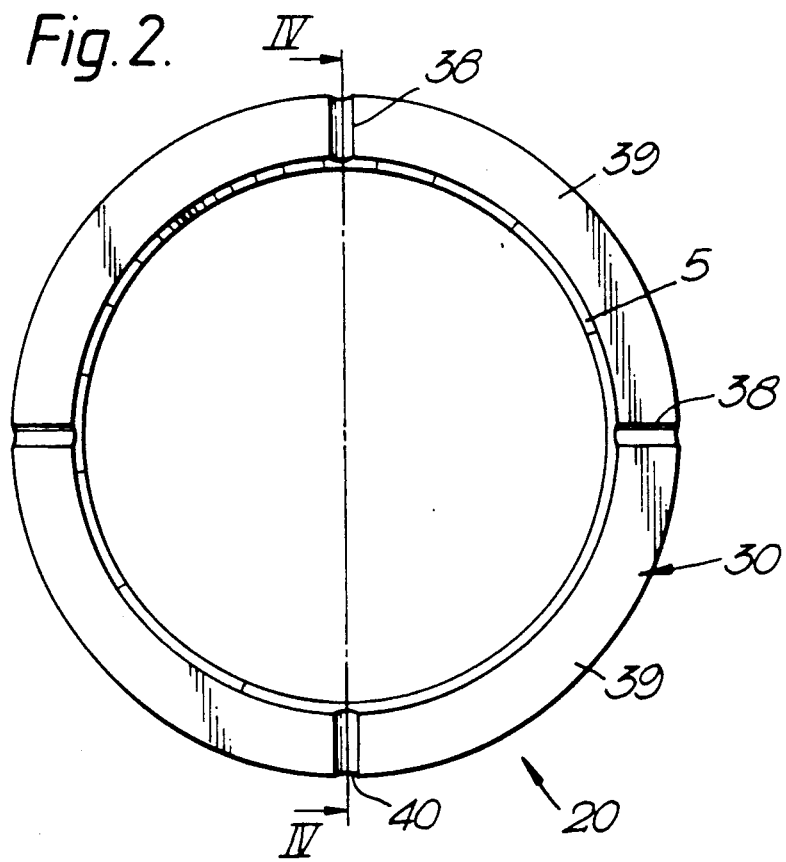
FIG. 2 shows a face of a buffer seal ring.
Figure 3:
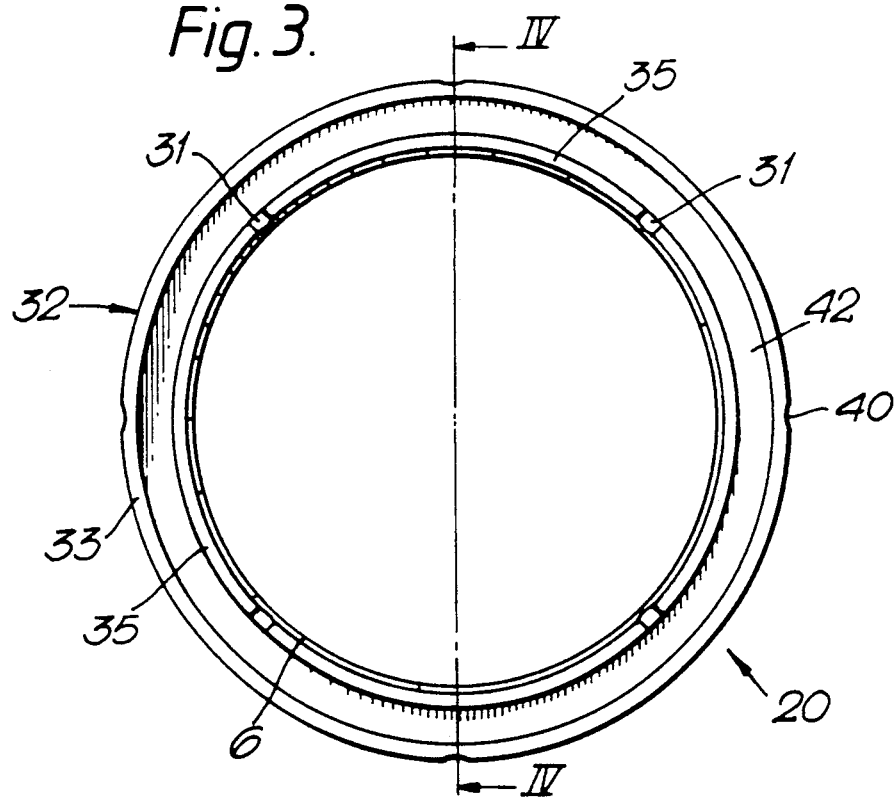
FIG. 3 shows the other face of the seal ring shown in FIG. 2.

With reference to FIG. 1, a typical hydraulic cylinder gland has an annular housing 10 having a cylindrical bore 12 in which a piston rod P slides in the sense of arrow "A". Spaced along the bore are four housing grooves 14,18,22,26 in which are seated respectively a bearing sleeve 16 for the piston rod, a buffer seal 20, a single-acting rod or gland seal 24, and a wiper 26 which prevents external dirt from getting to the seals as the piston rod is retracted. The wiper, seals and bearing are all circular rings. The axial thickness of the buffer seal 20 is slightly less than the axial extent of its seating groove 18, so that it has a degree of axial freedom of movement.

FIGS. 2 to 5 show in detail the construction of the buffer seal 20. It is made of an elastomer. Suitable elastomers include polyurethane, copolyesters and hard nitrile rubber. It has a first, sealing face 32 and a second, pressure face 30 which are generally parallel and extend radially. It also has an inner diameter surface 34 and an outer diameter surface 36 which are generally cylindrical. The transitions from the inner diameter surface to the first and second faces 30,32 are provided with chamfers 5,6 which reduce the tendency of the seal to extrude, when under high pressure, into the narrow space between the bore 12 and the piston rod. Its radial dimensions are such that it is an interference fit between the outer wall of the groove 18 and the surface of the piston rod.

Typical dimensions for such a seal ring are 25–150 mm inner diameter, 3–15 mm radial thickness, and 3–10 mm axial thickness. These dimensions will be selected to give the above-mentioned radial interference fit in the housing groove, and an axial play of e.g. 5–20% of the axial seal thickness, preferably about 10%, in the housing groove.

Spaced equidistantly around the second, pressure face 30 of the seal are four grooves 38 running radially. In between these grooves, the face 30 forms four uniformly flat radial lands 39. The grooves 38 open inwardly at the chamfer 5, adjacent to the inner diameter of the seal ring. At the outer diameter, they join with four corresponding grooves 40 which extend axially on the outer diameter surface 36 from one face to the other of the seal. The grooves 38,40 are small in width compared to the circumference of the surfaces 30,36 in which they are formed, and shallow in relation to the overall thickness of the ring. Typically they might be 0.2–1 mm, more preferably 0.3–0.5 mm, in depth. They occupy 4%–5% of the circumference in this embodiment.

The radially outermost part of the first sealing face 32 of the ring is a sealing portion 33 with a flat radial surface. This is interrupted at its outer periphery by the openings of the peripheral axial grooves 40. Its radial extent is substantially less than half of the ring section. Radially inwardly of the sealing portion 33 is a driving portion 42. The surface of this is also flat and radial, is axially recessed relative to the seating portion 33, and has a radial extent somewhat larger than that of the sealing portion 33.

Radially inside the recess 42 is an annular support rib 35, the surface of which is in axial register with that of the sealing portion 33. Support rib 35 is interrupted at four points by communication notches 31 of the same depth as recess 42 and extending from that recess to open at the chamfer 6 adjacent the inner diameter 34. The support rib 35 is accordingly broken into four lands the notches 31 take up only a small portion of its circumference.

The recess 42 can be considered as a uniform section wide and shallow channel extending around the first face 32, the sealing portion 33 forming an outer wall thereof and the support rib 35 an inner wall, broken into separate ribs by the gaps 31.

The buffer seal is installed in the housing with its first face 32 towards the rod seal 24, opposing a first flat radial surface or side wall 21 of its housing groove 18. The second face 30 faces a corresponding radial surface 23 of the housing groove on the pressure side.

Under pressure operating conditions, and in particular where there may be pressure peaks from the pressure side, the buffer seal 20 is pressed against the left-hand (as seen in FIG. 1) radial surface 21 of its seating groove 18. The sealing portion 33 of the face 32 seals against that groove wall and, together with the radial interference fit between housing and piston rod, shields the main seal 24 from the effect of these pressure peaks. The peripheral grooves 40 are closed off by the housing groove wall 21 and sealing portion 33.

If for some reason a pressure trap occur in the space 8 between the rod seal and buffer seal, high-pressure fluid in this space 8 is able to communicate, via the notches 31, with the recessed surface 42 on the first face 32 of the seal. The recess 42 offers a substantial radial surface area which, when exposed to the high-pressure fluid, exerts a significant axial force sufficient to push the buffer seal to the right as shown in FIG. 1. This brings the sealing portion 33 out of engagement with the groove wall 21 of the seal housing, and simultaneously opens the peripheral grooves 40 at the rod seal end. The high-pressure fluid can flow past the seal along the grooves 40 and inwardly along the pressure side grooves 38 to vent into the bore at an inwardly-spaced vent location even when the seal 20 is pressed against the pressure side 23 of the housing groove. In this way the pressure trap is released.

Support rib 35 allows communication to the large driving area 42 through the small notches 31, but supports the inner part of the seal face against the wall 21 of the housing groove to prevent it from twisting out of shape by deforming into the gap formed by the recess 42.

FIGS. 6 to 9 show a second embodiment. This has a main buffer ring 120 of polyurethane elastomer with, as in the first embodiment, a substantially flat radial pressure face 130, a substantially cylindrical outer peripheral face 136, and an axially-directed sealing face 132 which in use faces the rod seal. The outer edges of the radial face 130,132 have chamfers 156,155 at the transition to the outer periphery 136.

The sealing face 132 is of smaller radial extent than the pressure face 130, being interrupted at its inner edge by a rectangular-section recess 111 in which a hard support ring 106 is seated. The recess 111 and ring 106 occupy about half the axial thickness of the main ring 120 and just over a quarter of its radial thickness. The smooth cylindrical inner surface of the support ring 106 is substantially in radial register with the inner sealing surface 134 of the main ring.

Support ring 106 is to bear against the wall of the housing groove in use, to help prevent extrusion of the softer main ring 120 into the gap between bore and rod. This is particularly appropriate when very high pressures and/or large bore-rod gaps are used. The ring 106 shown is made of polyacetal, but could be of other suitable hard and strong material e.g. glass-filled nylon.

An annular sealing projection 133 extends continuously around the outer edge of the sealing face 132, next to the edge chamfer 155. This sealing rib 133 has a flat axially-directed sealing face which seals in use against the housing groove side wall. It occupies about one quarter of the radial width of the overall sealing face 132, at an outer part thereof. Radially inside the sealing portion 133, and entirely outwardly surrounded by it, is a continuous annular recess or channel 142 with a flat axially-directed base providing a driving surface. Channel 142 occupies between about a quarter and a half of the radial extent of sealing face 132, and between 5 and 20% preferably about 10%-of the axial thickness of the seal ring 120.

Four elongate circumferentially-extending support ribs 135 project from the sealing face 132 around the inside of channel 142 to form an inner wall thereof. They are exactly in flat register with the sealing portion 133, but are not continuous being broken by four equally spaced communication gaps 131 of the same depth as channel 142. Gaps 131 occupy about 10% of the circumference of the inner wall formed by the ribs 135. Preferably any individual such gap should not be more than about 10% of circumference, and preferably substantially less, to avoid risk of deformation of the seal under pressure.

As in the first embodiment, four equally spaced peripheral grooves 140 and four equally spaced radially-extending grooves 138 communicating with them are provided, on the outer periphery and pressure face 130 respectively. In this embodiment they are rather wider, like the gaps 131 occupying about 10% of the ring circumference. Instead of opening through the sealing portion as in the first embodiment, the peripheral grooves 140 open only into the edge chamfer 155 at the sealing side.

To enable fluid communication from the bore to the gaps 131, the anti-extrusion ring 106 is also provided with communication grooves. Ring 106 is made double-sided, with four equally spaced radial grooves 109 on its first side 107 and four similar grooves 110—staggered by 45° relative to grooves 109—on its second face 108. The direction of fitting of ring 106 into its recess 111 is therefore immaterial.

It can be seen that fluid is able to communicate via grooves 109 of the support ring to the gaps 131 past the support ribs 135 and thence to the driving surface of the channel 142, to achieve the driving effect described above for the first embodiment. Extrusion ring grooves 109 need not be circumferentially aligned with gaps 131 as shown in FIG. 8, since an annular circulation space 160 is provided on the inside of ribs 135 in the form of an axial step at the edge of recess 111.

It is not strictly necessary that the hard support ring have specially-provided grooves to allow radial communication. For example, a plain-sided support ring may be used provided that it is undersize in its seating groove so that fluid can get past it under pressure.

What is claimed is:

1. An elastomeric, circumferentially continuous buffer sealing ring for, in use, acting between a bore defining an axial direction and a part relatively axially movable therein, with the sealing ring seated in an axially oversize annular housing groove in the bore, said sealing ring having an inner periphery defining a sealing lip for sealingly engaging said axial part;

an outer periphery for pressing radially outwardly against the housing grove;

two opposite axially directed sides extending radially between the inner and outer peripheries, one said side being a sealing side and the other a pressure side;

an axially projecting annular sealing portion formed on the sealing side; and at least one axially-directed driving surface on the sealing side, said at least one driving surface being recessed axially relative to the annular sealing portion and communicating inwardly to the inner periphery of the sealing ring at the sealing side thereof, in relation to the sealing lip, through at least one axially recessed communication opening, to, in use, admit fluid from a space on the sealing side of the seal between said at least one driving surface and an axially-facing wall of the housing groove, said annular sealing portion extending continuously around the ring radially outwardly of said at least one driving surface so as to sealingly abut against said axially-facing wall of the housing groove such as to prevent radially-outward escape of the fluid from between said at least one driving surface and said axially-facing wall.

2. A sealing ring as claimed in claim 1, comprising at least one pressure release conduit communicating between the pressure side and the sealing side, there being an opening of each said pressure release conduit at said sealing side, with the annular sealing portion being at least partly radially inward of each said opening.

3. A sealing ring as claimed in claim 2 in which the at least one pressure release conduit communicates to a vent location at the pressure side, the vent location being substantially radially inward of the opening at the sealing side.

4. A sealing ring as claimed in claim 2 in which the at least one pressure release conduit comprises a groove in the outer periphery, extending between the sealing side and the pressure side.

5. A sealing ring as claimed in claim 4 in which the at least one pressure release conduit further comprises a radially inwardly extending groove in the pressure side, communicating with the groove in the outer periphery.

6. A sealing ring as claimed in claim 2, comprising a plurality of the pressure release conduits spaced around the ring.

7. A sealing ring as claimed in claim 1 in which the total radial surface area of the at least one driving surface is at least 10% of the radial surface area of the sealing side of the ring.

8. A sealing ring as claimed in claim 7 in which the total radial surface area of the at least one driving surface is at least 20% of the radial surface area of the sealing side of the ring.

9. A sealing ring as claimed in claim 1 in which the sealing side has at least one circumferentially-extending recess providing the at least one driving surface.

10. A sealing ring as claimed in claim 9 in which a single said circumferentially-extending recess extends all around the ring.

11. A sealing ring as claimed in claim 9 in which the circumferentially-extending recess is of substantially uniform cross-section.

12. A sealing ring as claimed in claim 9, comprising at least one axially-projecting support rib on the sealing side, the support rib extending circumferentially and radially inwardly of at least part of the circumferentially-extending recess.

13. A sealing ring as claimed in claim 12, comprising a series of said support ribs separated by gaps, which gaps provide said recessed communication opening to the at least one driving surface provided by the circumferentially-extending recess.

14. A buffer seal comprising a circular ring of elastomeric material, the ring having:
   first and second axially-directed side faces, the side faces being generally flat, substantially parallel, and having respectively first and second outer edges and first and second inner edges;
   an outer face, the outer face being generally cylindrical and extending axially between the outer edges of the side faces;
   a radially inwardly directed sealing face; the first said side face having
      (i) a wide shallow channel extending circumferentially, the channel having an axially-directed base surface;
      (ii) a sealing portion extending continuously around the first side face, said sealing portion having an axially-directed sealing surface and forming a continuous radially outer wall of the channel;
      (iii) at least one support portion extending circumferentially on the first side face and forming a discontinuous radially inner wall of the channel, and
      (iv) at least one communication recess extending inwardly through said inner wall from the channel;
   the buffer seal further comprising at least one pressure release conduit in the outer face, extending from one outer edge to the other, and
   at least one pressure release conduit in the second face, communicating with said conduit in the outer face and extending radially inwardly therefrom.

15. A buffer seal as claimed in claim 14 in which the outer edges are chamfered.

16. A buffer seal as claimed in claim 14 having an annular recess extending around the radially inner edge of the first side face, and comprising a relatively hard support ring seated in that annular recess.

17. A buffer seal as claimed in claim 16 in which the hard support ring has at least one radially extending recess communicating with the at least one communication recess in the inner wall.

18. An improved hydraulic seal assembly in a bore in which a rod moves axially, which assembly comprises:
   an annular rod seal housing groove in the bore, and an annular rod seal seated in said groove and making sealing engagement between the bore and the rod;
   an annular buffer seal housing groove spaced axially from the rod seal housing groove in the bore, and having an axially-directed side wall on the rod seal side;
   an annular buffer seal seated in the buffer seal housing groove, the buffer seal ring having a sealing side directed axially towards the rod seal, a pressure side directed axially away from the rod seal, an outer periphery urged resiliently against the corresponding wall of the buffer seal housing groove and an inner periphery sealingly engaging around the rod,
   and wherein the buffer seal housing groove is axially larger than the buffer seal ring whereby that ring is axially movable therein, and the assembly has a buffer sealing condition with the buffer seal ring urged axially in its housing groove against said side wall to seal thereagainst and make a full seal between rod and bore,
   wherein the improvement comprises
   (i) an axially directed driving surface on the sealing side of the buffer seal ring, the driving surface being spaced axially from the side wall of the housing grove in opposition thereto in the sealing condition, to define a driving space between them, the driving space being in fluid communication with the bore on the rod seal side whereby any excess fluid pressure in the bore in the rod seal side is communicated to the driving surface to drive the buffer seal ring axially in its housing groove out of the sealing condition and into a pressure release condition;
   (ii) an annular sealing portion on the sealing side of the buffer seal ring, said annular sealing portion projecting axially in relation to said driving surface, the annular sealing portion extending continuously around the ring at the radial outside of the driving surface, and sealing against said side wall of the housing groove to provide said full seal in the sealing condition, and
   (iii) pressure release conduits which are closed off in the sealing condition, but communicating past the seal from the rod seal side in the pressure release condition to allow release of excess fluid pressure.

19. An assembly according to claim 18 in which the radial surface area of the driving surface is at least 20% of the buffer seal ring radial surface area opposing the housing groove side wall on the sealing ring.

20. An assembly according to claim 18 in which the buffer seal ring comprises at least one supporting rib, the supporting rib projecting axially from the sealing side of the ring to abut against the housing groove side wall in the sealing condition and inhibit deformation of the buffer sealing ring into the driving space.

* * * * *